US012684379B2

(12) United States Patent
Usuba et al.

(10) Patent No.: US 12,684,379 B2
(45) Date of Patent: *Jul. 14, 2026

(54) LOCAL 5G MONITORING SYSTEM

(71) Applicant: ANRITSU CORPORATION, Kanagawa (JP)

(72) Inventors: Mitsuhiro Usuba, Kanagawa (JP); Atsushi Furuki, Kanagawa (JP); Yoshihiro Fukagawa, Kanagawa (JP); Satoshi Sasaki, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 716 days.

This patent is subject to a terminal disclaimer.

(21) Appl. No.: 18/068,810

(22) Filed: Dec. 20, 2022

(65) Prior Publication Data

US 2023/0292159 A1 Sep. 14, 2023

(30) Foreign Application Priority Data

Mar. 9, 2022 (JP) ................................. 2022-036360

(51) Int. Cl.
| | |
|---|---|
| *H04W 24/08* | (2009.01) |
| *H04W 24/10* | (2009.01) |
| *H04W 84/12* | (2009.01) |

(52) U.S. Cl.
CPC ........... *H04W 24/08* (2013.01); *H04W 24/10* (2013.01); *H04W 84/12* (2013.01)

(58) Field of Classification Search
CPC ..... H04W 24/08; H04W 24/10; H04W 84/12; H04W 24/04
See application file for complete search history.

(56) References Cited

U.S. PATENT DOCUMENTS

| | | | | |
|---|---|---|---|---|
| 2020/0127907 A1* | 4/2020 | Koo | ...................... | H04W 24/02 |
| 2021/0136603 A1* | 5/2021 | Kottkamp | ............. | H04W 24/00 |
| 2022/0294715 A1* | 9/2022 | Agrawal | ................. | H04L 43/04 |
| 2022/0384025 A1* | 12/2022 | Shelton, IV | .......... | A61M 21/02 |

FOREIGN PATENT DOCUMENTS

JP 2020-005009 A 1/2020

* cited by examiner

*Primary Examiner* — Kwang B Yao
(74) *Attorney, Agent, or Firm* — McDonald Hopkins LLC

(57) ABSTRACT

The local 5G monitoring system includes a measuring device that measures radio waves from a base station of a local 5G system, wireless terminals, a first server device that belongs to the same wireless local area network (wireless LAN) as the measuring device and the wireless terminals, collects measurement data from the wireless terminals, belongs to the same local area network (LAN) as the measuring device, and is connected to the Internet, and a second server device that is connected to the first server device via the Internet, and is configured to be referred to by a user, in which the first server device uses the measurement data when installation of the local 5G system is completed, as reference information, and determines and notifies the user that an abnormal state occurs, when the measurement data during an operation of the local 5G system exceeds a threshold from the reference information.

7 Claims, 3 Drawing Sheets

Reference information database

Measurement result

Reference information

| | Measuring device 21 | Terminal 22a | Terminal 22b | Terminal 22c | Terminal 22d |
|---|---|---|---|---|---|
| Position | A | B | C | D | E |
| Radio waves | W a | W b | W c | W d | W e |
| Throughput | T a | T b | T c | T d | T e |
| Delay | D a | D b | D c | D d | D e |

Measurement result

| | Measuring device 21 | Terminal 22a | Terminal 22b | Terminal 22c | Terminal 22d |
|---|---|---|---|---|---|
| Position | A | B | C | D | E |
| Radio waves | Wa | Wb | Wc | Wd | We |
| Throughput | Ta | Tb | Tc | Td | Te |
| Delay | Da | Db | Dc | Dd | De |

Reference information database

Reference information

FIG. 2

LOCAL 5G MONITORING SYSTEM

TECHNICAL FIELD

The present invention relates to a local 5G monitoring system for monitoring the operational performance of a local 5G system.

BACKGROUND ART

Local 5G systems have been provided in which by using the various techniques used in the fifth generation mobile communication system (hereinafter also referred to as "5G"), organizations (local governments, companies, or the like) that are not telecommunications carriers have facilities and uses the facilities for exclusively providing services on land it owns or as self-employed communication facilities. Note that the local 5G system is sometimes called a private 5G system.

After such a local 5G system is installed in the user's actual field, in subsequent operations, abnormal states such as a decrease in a transmission speed or communication delay may occur due to factors such as equipment failure or stoppage and radio interference.

Unlike a network configuration using a relatively inexpensive wireless local area network (LAN), the local 5G system is an expensive system that emphasizes large capacity and low delay, and a time when abnormal states such as a decrease in a transmission speed or communication delay occur needs to be kept extremely short.

Patent Document 1 describes constant monitoring of the radio environment within the communication area of a wireless network.

RELATED ART DOCUMENT

Patent Document

[Patent Document 1] JP-A-2020-5009

DISCLOSURE OF THE INVENTION

Problem that the Invention is to Solve

However, even if there is no problem when the local 5G system is installed, thereafter, there is a possibility that radio interference and jamming waves occur with the public 5G or adjacent local 5G system.

In order to detect such an abnormal state, it is required to perform measurements at a plurality of points such that the measurement points can be changed or added flexibly.

Therefore, an object of the present invention is to provide a local 5G monitoring system capable of flexibly changing and adding the measurement points while performing measurements at a plurality of measurement points.

Means for Solving the Problem

A local 5G monitoring system according to the present invention is a local 5G monitoring system that monitors a local 5G system, including: a measuring device that measures radio waves from a base station of the local 5G system; a wireless terminal that is connected to a network of the local 5G monitoring system by wireless communication and measures the radio waves from the base station; a first server device that belongs to the same wireless local area network (wireless LAN) as the wireless terminal, collects measurement data from the wireless terminal, belongs to the same local area network (LAN) as the measuring device, and is connected to the Internet; and a second server device that is connected to the first server device via the Internet, and is configured to be referred to by a user, in which the first server device uses the measurement data from the measuring device and the wireless terminal when installation of the local 5G system is completed, as reference information, and determines and notifies the user that an abnormal state occurs, when the measurement data from the measuring device and the wireless terminal during an operation of the local 5G system exceeds a threshold from the reference information.

With this configuration, measurement is performed by the measuring device, and a wireless terminal connected to the network of the local 5G monitoring system by wireless communication. Therefore, it is possible to perform measurements at a plurality of measurement points, and to flexibly change or add the measurement points.

Further, since measurement can be performed by a measuring device and a wireless terminal, the optimal local 5G monitoring system for each user can be built by a combination of a measuring device that can perform highly accurate measurement and a wireless terminal that performs simple measurement.

Further, in the local 5G monitoring system according to the present invention, the measuring device and the wireless terminal measure a state of Internet Protocol (IP) data communication in a wireless network of the local 5G system in addition to the radio waves, as the measurement data.

With this configuration, it is possible to detect an abnormal state of the IP data communication of the wireless network of the local 5G system, based on the measurement data when the local 5G system is installed.

Further, in the local 5G monitoring system according to the present invention, the second server device displays a monitor summary screen showing an overview of states of the measuring device and the wireless terminal.

With this configuration, an overview of the states of the measuring device and the wireless terminal can be checked via the Internet, and an abnormal state can be quickly dealt with.

Further, in the local 5G monitoring system according to the present invention, the second server device displays a measurement details screen showing the measurement data of the measuring device or the wireless terminal selected on the monitor summary screen.

With this configuration, the measurement data of the measuring device or wireless terminal selected on the monitor summary screen is displayed as the measurement details screen, and the detailed measurement data can be displayed individually, thereby quickly dealing with abnormal states.

Advantage of the Invention

The present invention can provide a local 5G monitoring system capable of flexibly changing and adding the measurement points while performing measurements at a plurality of measurement points.

BRIEF DESCRIPTION OF THE DRAWINGS

FIG. 2 is a conceptual diagram of an abnormal state detection method for the local 5G monitoring system according to the embodiment of the present invention.

BEST MODE FOR CARRYING OUT THE INVENTION

Hereinafter, a local 5G monitoring system according to an embodiment of the present invention will be described in detail with reference to the drawings.

Figure 1:
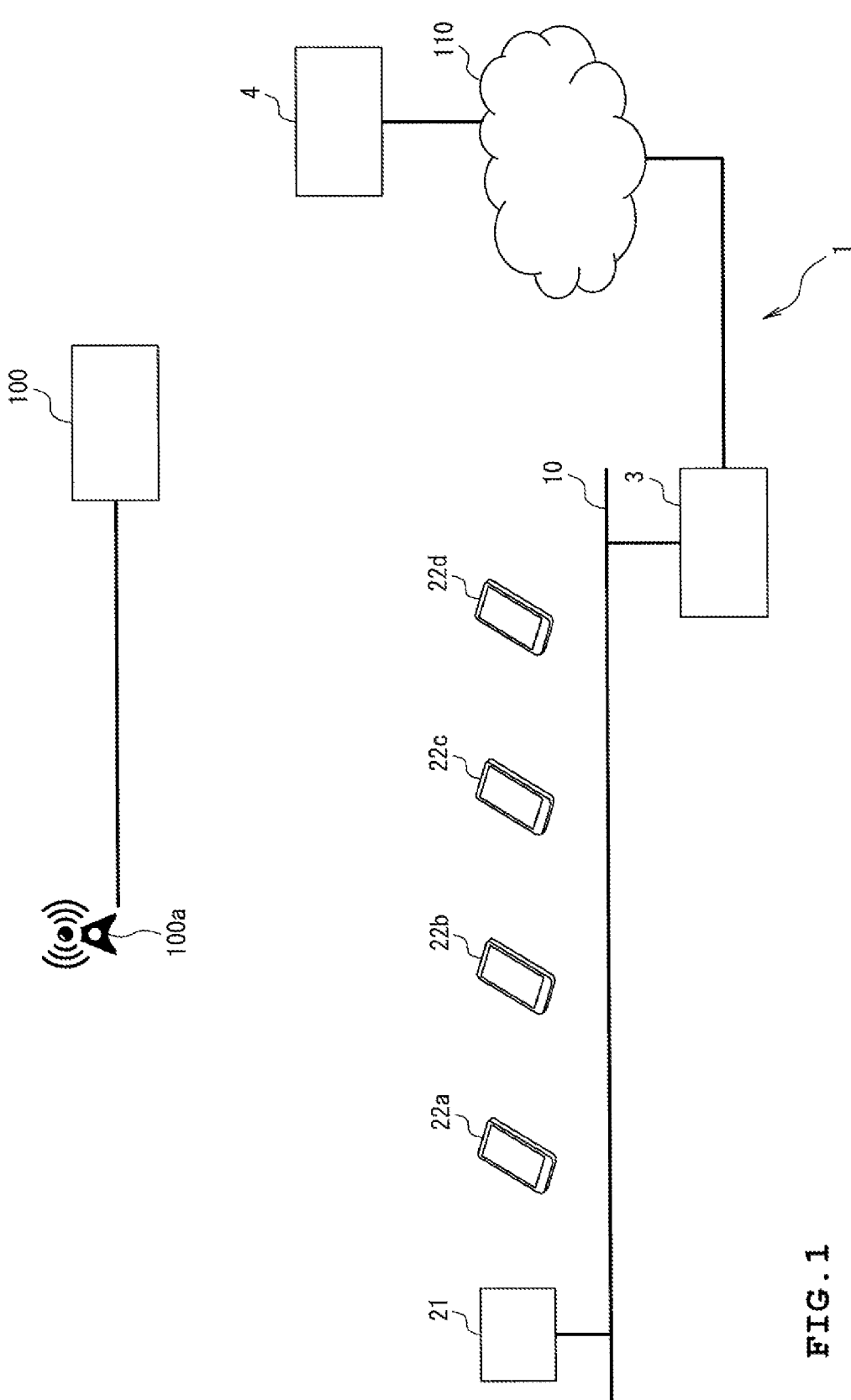
FIG. 1 is a schematic configuration diagram of a local 5G monitoring system according to an embodiment of the present invention.

In FIG. 1, a local 5G monitoring system 1 according to an embodiment of the present invention is installed within the service area of a local 5G system 100.

The local 5G monitoring system 1 monitors the state of radio waves from the base station 100a of the local 5G system 100, the state of IP data communication in the wireless network of the local 5G system 100, and the like, and determines whether an abnormal state occurs.

The local 5G monitoring system 1 includes a measuring device 21, a plurality of wireless terminals 22a, 22b, 22c, and 22d, a first server device 3, and a second server device 4.

The measuring device 21 measures radio waves from the base station 100a of the local 5G system 100. The measuring device 21 measures IP data communication of the wireless network of the local 5G system 100. The measuring device 21 measures throughput, communication delay, and the like, as measurements of IP data communication.

The wireless terminals 22a, 22b, 22c, and 22d are smartphones, mobile terminals, or the like that support 5G communication. Note that, in the present embodiment, the wireless terminals 22a, 22b, 22c, and 22d are mainly used by being fixed to predetermined installation positions.

The wireless terminals 22a, 22b, 22c, and 22d measure radio waves from the base station 100a of the local 5G system 100. The wireless terminals 22a, 22b, 22c, and 22d measure IP data communication of the local 5G system 100. The wireless terminals 22a, 22b, 22c, and 22d measure throughput, communication delay, or the like, as IP data communication measurements.

The wireless terminals 22a, 22b, 22c, and 22d are capable of wireless communication such as wireless LAN and Long Term Evolution (LTE), and can access the wireless LAN of the local 5G monitoring system 1 and the Internet 110 by wireless communication.

The first server device 3 and the second server device 4 are each a computer device. The computer devices each include a central processing unit (CPU), a read only memory (ROM), a random access memory (RAM), a non-volatile storage medium such as a hard disk device, various input/output ports, a display device, and an input device such as a pointing device or a keyboard device, which are not shown.

Programs for controlling the respective computer devices are stored in the ROMs and hard disk devices of these computer devices. That is, the computer device performs the control of the present embodiment, by the CPU executing the programs stored in the ROM and the hard disk device using the RAM as a work area.

The first server device 3 and the measuring device 21 are connected by a LAN 10 such that data can be transmitted and received to and from each other via the LAN 10.

The first server device 3 is connected to a wireless LAN and can communicate via the wireless LAN. The first server device 3 and the wireless terminals 22a, 22b, 22c, and 22d are connected by the wireless LAN of the local 5G monitoring system 1, and can transmit and receive data to and from each other via the wireless LAN.

The first server device 3 is connected to the Internet 110, and can transmit and receive e-mails and access social networking service (SNS) via the Internet.

The second server device 4 is connected to the Internet 110, and the first server device 3 and the second server device 4 can transmit and receive data to and from each other via the Internet 110.

The second server device 4 has, for example, a function of a web server, and can provide information to personal computers and smartphones via the Internet 110.

In the present embodiment, the first server device 3 uses the measurement data measured by the measuring device 21 and the wireless terminals 22a, 22b, 22c, and 22d when the local 5G system 100 is installed, as reference information, and makes a notification, in a case where the measurement data measured by the measuring device 21 and the wireless terminals 22a, 22b, 22c, and 22d during the operation of the local 5G system 100 exceeds a threshold from the reference information and deteriorate.

In the local 5G system 100, the required throughput, communication delay, or the like is designed, the base station 100a, or the like is installed while performing measurement by the measuring device 21 and the wireless terminals 22a, 22b, 22c, and 22d so as to satisfy the designed throughput and communication delay, and when it is checked that the designed throughput and communication delay are satisfied, the installation is completed.

For example, when registration of reference information is selected by an input to the input device, the first server device 3 stores the measurement data obtained by the measuring device 21 and the wireless terminals 22a, 22b, 22c, and 22d at the time of the selection, as the reference information, in the hard disk device.

For example, as shown in FIG. 2, the first server device 3 stores the measurement data measured by the measuring device 21 and the wireless terminals 22a, 22b, 22c, and 22d when the local 5G system 100 is installed, as reference information, in the reference information database. The reference information database is stored in the hard disk device of the first server device 3, for example.

As the measurement data by the measuring device 21 and the wireless terminals 22a, 22b, 22c, and 22d, for example, as shown in FIG. 2, the state of radio waves (shown as "radio waves" in FIG. 2), throughput, delay, and the like are measured.

As the state of radio waves, for example, Reference Signal Received Power (RSRP), Reference Signal Received Quality (RSRQ), or the like are measured.

Since the measurement of RSRP and RSRQ in the wireless terminals 22a, 22b, 22c, and 22d is performed by the basic software of the wireless terminals 22a, 22b, 22c, and 22d, the information is acquired by, for example, a smartphone application, or the like and is transmitted to the first server device 3 as measurement data.

Throughput and delay are measured by communicating with, for example, a server device and a measuring device provided in the local 5G system 100.

The measuring device 21 and the wireless terminals 22a, 22b, 22c, and 22d, for example, perform wireless communication with a server device provided in the local 5G system 100 via the base station 100*a* to measure throughput and delay.

For example, the measuring device 21 and the wireless terminals 22*a*, 22*b*, 22*c*, and 22*d* transmit an "echo request" packet of Internet Control Message Protocol (ICMP) to the server device, and measure the wireless network delay of the local 5G system 100 by using time until an "echo reply" is returned from the server device (Round-Trip Time).

The wireless terminals 22*a*, 22*b*, 22*c*, and 22*d* perform wireless communication with the server device provided in the local 5G system 100, for example, by a smartphone application or the like, via the base station 100*a* to measure throughput and delay.

The first server device 3, for example, compares the measurement data measured by the measuring device 21 and the wireless terminals 22*a*, 22*b*, 22*c*, and 22*d* at predetermined time intervals with the reference information, and determines that an abnormal state occurs, when the measurement data exceeds a threshold from the reference information and deteriorates.

For example, the first server device 3 determines that an abnormal state occurs, when at least one of the RSRP values measured by the measuring device 21 and the wireless terminals 22*a*, 22*b*, 22*c*, and 22*d* exceeds a threshold from the reference information and is reduced.

For example, the first server device 3 determines that an abnormal state occurs, when at least one of the throughputs measured by the measuring device 21 and the wireless terminals 22*a*, 22*b*, 22*c*, and 22*d* exceeds a threshold from the reference information and is reduced.

For example, the first server device 3 determines that an abnormal state occurs, when at least one of the network delays measured by the measuring device 21 and the wireless terminals 22*a*, 22*b*, 22*c*, and 22*d* exceeds a threshold from the reference information and increases.

In addition, it is determined that it is abnormal in a case where the measurement data of at least one of the measuring device 21 and the wireless terminals 22*a*, 22*b*, 22*c*, and 22*d* exceeds a threshold from the reference information and deteriorates, but it may be determined that it is abnormal in a case where the measurement data of a predetermined number of measuring device 21 and wireless terminals 22*a*, 22*b*, 22*c*, and 22*d* exceeds a threshold from the reference information and deteriorates.

Further, the threshold may be changed depending on the installation positions of the measuring device 21 and the wireless terminals 22*a*, 22*b*, 22*c*, and 22*d*.

When detecting that an abnormal state has occurred, the first server device 3 notifies a user of the detection.

The first server device 3 notifies the user by, for example, warning display on a display device or the like, alarm sound by a buzzer or the like, transmission of an e-mail, posting on an SNS, or the like.

The first server device 3 transmits measurement data of the measuring device 21 and the wireless terminals 22*a*, 22*b*, 22*c*, and 22*d* to the second server device 4.

When detecting that an abnormal state has occurred, the first server device 3 transmits the information to the second server device 4 together with the measurement data of the measuring device 21 and the wireless terminals 22*a*, 22*b*, 22*c*, and 22*d*. The first server device 3 transmits, to the second server device 4, for example, the information on the measuring device 21 and the wireless terminals 22*a*, 22*b*, 22*c*, and 22*d* determined to be in an abnormal state, the difference between the measurement data and the threshold, and the like as abnormal state information.

The second server device 4 accumulates and manages the measurement data received from the first server device 3 in time series such that it can be referred to from, for example, a browser of a personal computer or a smartphone.

The second server device 4 displays measurement data on each of the measuring device 21 and the wireless terminals 22*a*, 22*b*, 22*c*, and 22*d*, for example, as in the table shown in FIG. 2.

The second server device 4 displays, for example, the measurement data, the measuring device 21, and the wireless terminals 22*a*, 22*b*, 22*c*, and 22*d*, of which measurement data is determined to be in an abnormal state, in a changed color so as to be displayed differently from other measurement data, measuring devices, or wireless terminals, for example.

The second server device 4, for example, analyzes the measurement data of each of the measuring device 21 and the wireless terminals 22*a*, 22*b*, 22*c*, and 22*d* in time series, and displays the measuring device 21 and the wireless terminals 22*a*, 22*b*, 22*c*, and 22*d*, in which a sign of an abnormal state is detected, in a changed color so as to be displayed differently from other measuring devices.

The second server device 4 uses, for example, artificial intelligence (AI) to detect the sign of an abnormal state.

Figure 3:
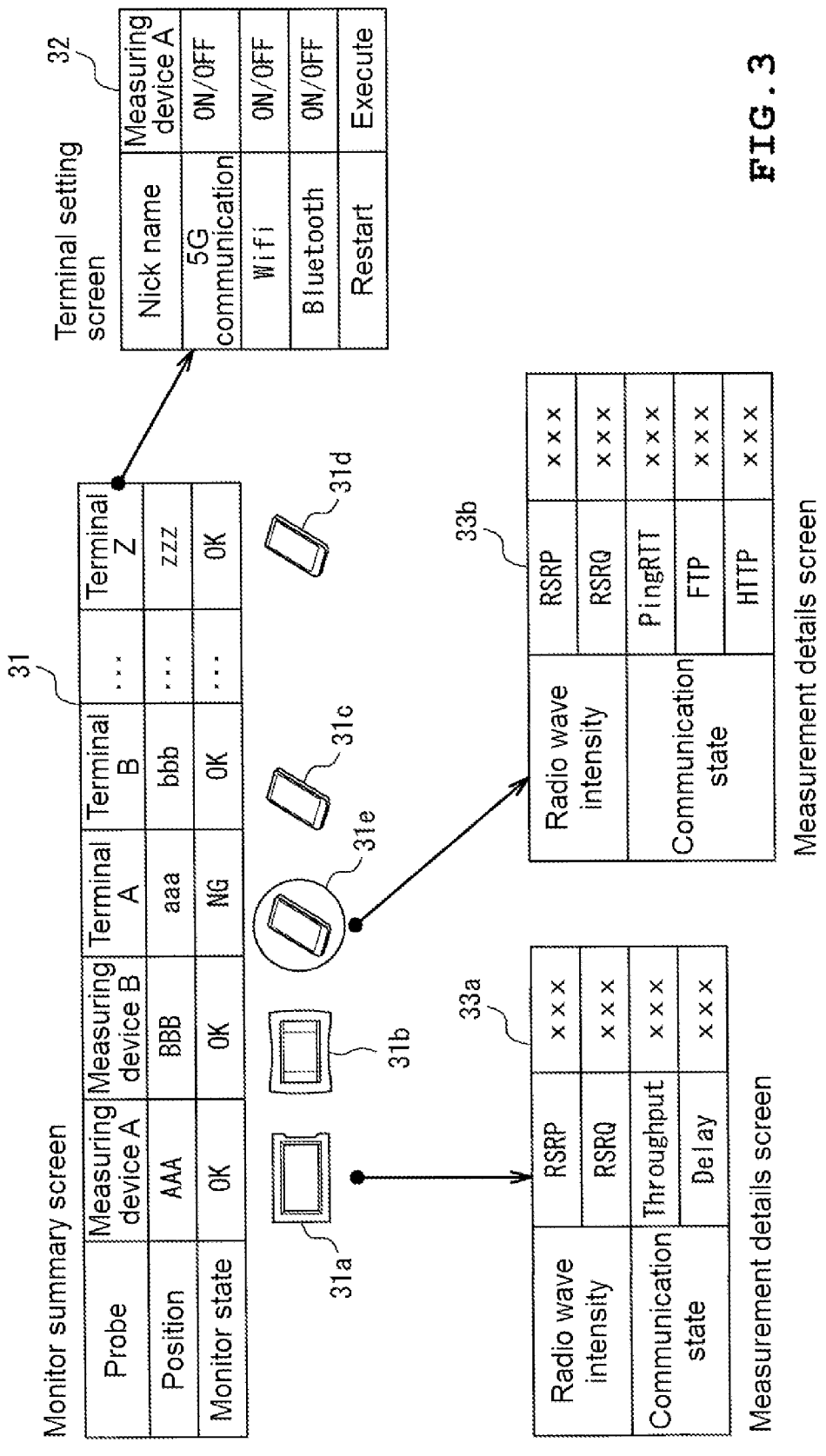
FIG. 3 is a diagram showing a display example of the state of measuring devices and wireless terminals of the local 5G monitoring system according to the embodiment of the present invention.

For example, as shown in FIG. 3, the second server device 4 may display the states of the measuring device 21 and the wireless terminals 22*a*, 22*b*, 22*c*, and 22*d*.

In FIG. 3, a monitor summary screen 31 displays an overview of the states of the measuring device 21 and the wireless terminals 22*a*, 22*b*, 22*c*, and 22*d*.

When on the monitor summary screen 31, for example, the probe portion is selected by the input device, the second server device 4 displays the terminal setting screen 32.

On the terminal setting screen 32, for example, a name to be displayed in the probe portion of the monitor summary screen 31 is set, or turning on or off of 5G communication, Wi-Fi (registered trademark) communication, and Bluetooth (registered trademark) communication is selected, or the measuring device 21 and the wireless terminals 22*a*, 22*b*, 22*c*, and 22*d* can be restarted.

The monitor summary screen 31 displays icons 31*a*, 31*b*, 31*c*, and 31*d* corresponding to the measuring device 21 and the wireless terminals 22*a*, 22*b*, 22*c*, and 22*d*, respectively.

When on the monitor summary screen 31, for example, the icon 31*a* indicating the measuring device 21 is selected by the input device, the second server device 4 displays the measurement details screen 33*a*.

On the measurement details screen 33*a*, for example, RSRP and RSRQ are displayed as the radio wave intensity, and throughput ("Throughput" in the drawing) and communication delay ("Delay" in the drawing) are displayed as the communication states.

When on the monitor summary screen 31, for example, the icon 31*e* indicating the wireless terminals 22*a*, 22*b*, 22*c*, and 22*d* is selected by the input device, the second server device 4 displays the measurement details screen 33*b*.

On the measurement details screen 33*b*, for example, RSRP and RSRQ are displayed as radio wave intensity, and as communication states, communication delay ("PingRTT" in the figure), throughput ("FTP" in the figure) by file transfer protocol (FTP) communication, and throughput ("HTTP" in the figure) by HyperText Transfer Protocol (HTTP) communication are displayed.

The second server device 4 may accumulate and manage measurement data from a plurality of first server devices 3 and provide information via the Internet 110.

By doing so, it is possible to centrally manage a plurality of local 5G systems 100 installed in remote locations, and to efficiently monitor the systems.

As described above, in the above-described embodiment, measurements are performed by the measuring device 21 and the wireless terminals 22a, 22b, 22c, and 22d that support 5G communication, so measurements can be performed at a plurality of measurement points.

Further, since the wireless terminals 22a, 22b, 22c, and 22d and the first server device 3 are connected by a wireless LAN, it is possible to flexibly change and add the measurement points.

Further, since measurement can be performed by the measuring device 21 and the wireless terminals 22a, 22b, 22c, and 22d, the optimal local 5G monitoring system 1 for each user can be built by a combination of the measuring device 21 that can perform highly accurate measurement and the wireless terminals 22a, 22b, 22c, and 22d that perform simple measurement.

Further, since the measuring device 21 that can perform highly accurate measurement is provided, it is possible to check interference in the spectrum that cannot be detected by the wireless terminals 22a, 22b, 22c, and 22d, and to investigate the cause in detail.

In addition, since the measuring device 21 performs monitoring, it is possible to check the interference and investigate the cause in detail in the measurement data, by measuring the latency with high accuracy, which cannot be detected by the wireless terminals 22a, 22b, 22c, and 22d.

Further, by providing a wireless terminal that receives radio waves of frequencies adjacent to the frequency of the radio waves used in the local 5G system 100, it is possible to know the state of adjacent frequencies, and detect radio interference and jamming waves with public 5G and adjacent local 5G systems.

Further, the measuring device 21 may be configured to be connectable to the Internet 110, the measurement data of the measuring device 21 and the wireless terminals 22a, 22b, 22c, and 22d may be directly transmitted to the second server device 4 via the Internet 110, and the second server device 4 may detect an abnormal state, or notify the user by transmitting an e-mail or posting to SNS, or make the measurement data be referred to.

In the present embodiment, an example is shown in which one measuring device and four wireless terminals are used, but a plurality of measuring devices or more wireless terminals may be used.

Although an embodiment of the present invention has been disclosed, it will be apparent that modifications may be made by those skilled in the art without departing from the scope of the present invention. All such modifications and equivalents are intended to be included in the following claims.

DESCRIPTION OF REFERENCE NUMERALS AND SIGNS

1: Local 5G monitoring system
3: First server device
4: Second server device
21: Measuring device
22a, 22b, 22c, 22d: Wireless terminal
31: Monitor summary screen
33a, 33b: Measurement details screen
100: Local 5G system
100a: Base station

What is claimed is:
1. A local 5G monitoring system that monitors a local 5G system, comprising:
a measuring device that measures radio waves from a base station of the local 5G system;
a wireless terminal that is connected to a network of the local 5G monitoring system by wireless communication and measures the radio waves from the base station;
a first server device that belongs to a same wireless local area network (wireless LAN) as the wireless terminal, collects measurement data from the wireless terminal, belongs to the same local area network (LAN) as the measuring device, collects measurement data from the measuring device, and is connected to the Internet; and
a second server device that is connected to the first server device via the Internet, and is configured to be referred to by a user,
wherein the first server device uses the measurement data from the measuring device and the wireless terminal when installation of the local 5G system is completed, as reference information, and determines and notifies the user that an abnormal state occurs, when the measurement data from the measuring device and the wireless terminal during an operation of the local 5G system exceeds a threshold from the reference information, and
wherein the measurement data is measured during the installation of the local 5G system and installation is complete when a designed throughput and designed communication delay are satisfied.

2. The local 5G monitoring system according to claim 1, wherein
the measuring device and the wireless terminal measure a state of Internet Protocol (IP) data communication in a wireless network of the local 5G system in addition to the radio waves, as the measurement data.

3. The local 5G monitoring system according to claim 1, wherein
the second server device displays a monitor summary screen showing an overview of states of the measuring device and the wireless terminal.

4. The local 5G monitoring system according to claim 3, wherein
the second server device displays a measurement details screen showing the measurement data of the measuring device or the wireless terminal selected on the monitor summary screen.

5. The local 5G monitoring system according to claim 3, wherein the second server device displays a measurement details screen showing the measurement data of the measuring device and the wireless terminal in a time series, and identifies which wireless terminal or measuring device is in an abnormal state by a color.

6. The local 5G monitoring system according to claim 1, further comprising a plurality of measurement devices, wherein the first server device determines if an abnormal state occurs if the measurement data of a predetermined number of measuring devices exceeds a threshold from the reference information.

7. The local 5G monitoring system according to claim 1, wherein the measurement data comprises Reference Signal Received Power (RSRP) values, and wherein the first server device determines if an abnormal state occurs if at least one of a RSRP values exceeds a threshold from the reference information.

* * * * *